No. 890,851. PATENTED JUNE 16, 1908.
C. G. DURFEE.
ELECTRIC METER AND SERVICE BOX.
APPLICATION FILED JUNE 3, 1907.

4 SHEETS—SHEET 1.

Witnesses
Geo. Schuern
C. H. Griesbauer

Inventor
C. G. DURFEE.
by H. B. Willson & Co.
Attorneys

No. 890,851. PATENTED JUNE 16, 1908.
C. G. DURFEE.
ELECTRIC METER AND SERVICE BOX.
APPLICATION FILED JUNE 3, 1907.
4 SHEETS—SHEET 2.
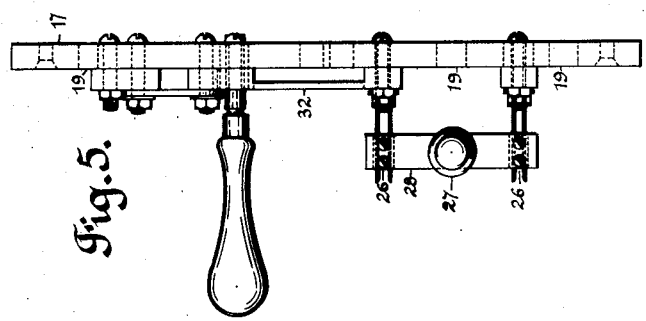
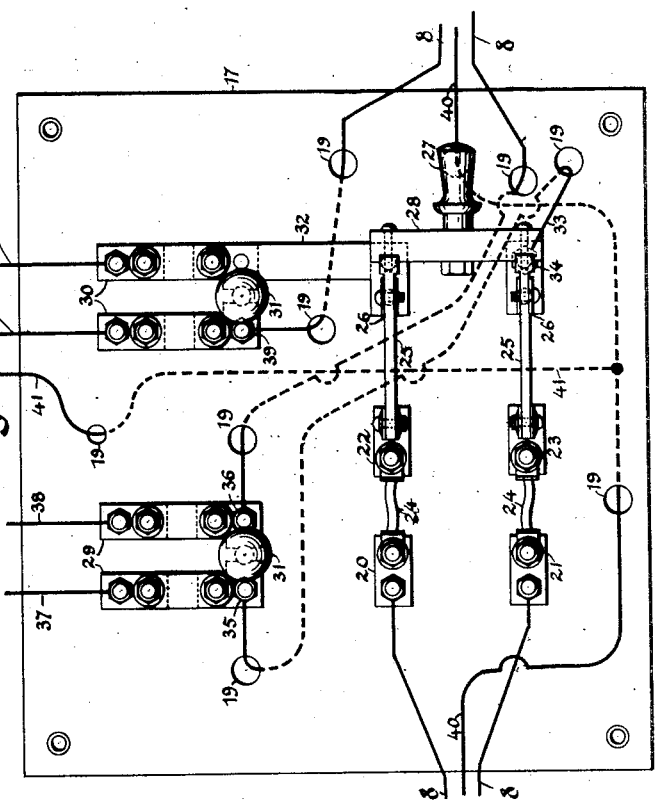
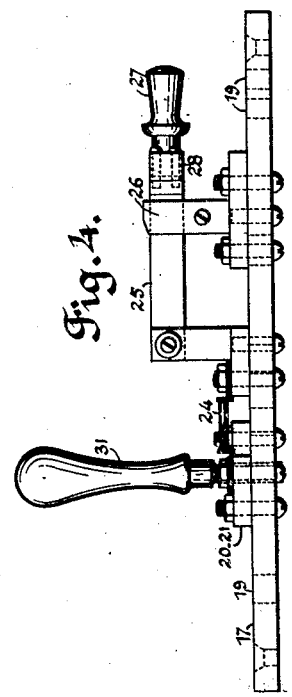
Witnesses
Geo. Schuern
C. H. Griesbauer
Inventor
C. G. DURFEE
by H. B. Willson & Co.
Attorneys No. 890,851.  
PATENTED JUNE 16, 1908.

C. G. DURFEE.  
ELECTRIC METER AND SERVICE BOX.  
APPLICATION FILED JUNE 3, 1907.

4 SHEETS—SHEET 3.

Witnesses  
Inventor  
C. G. DURFEE  
by H. B. Willson & Co.  
Attorneys

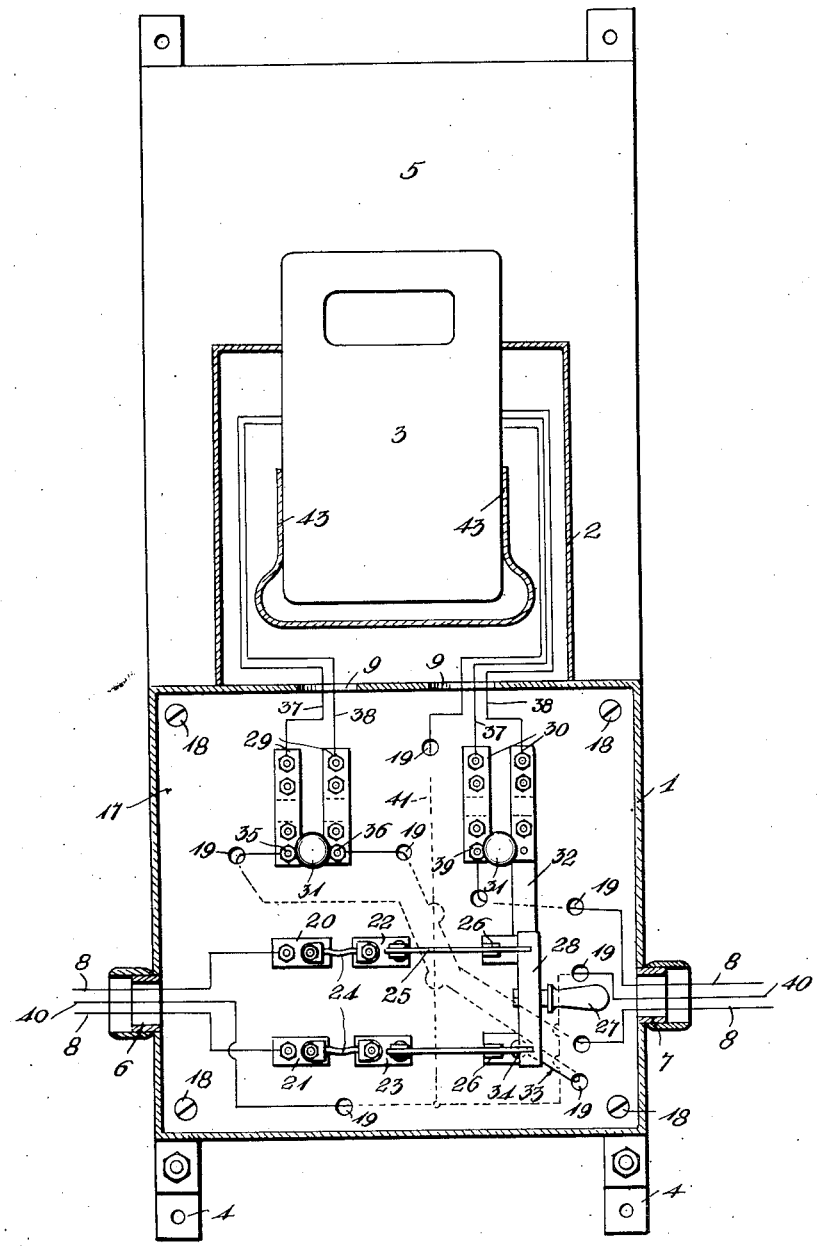

UNITED STATES PATENT OFFICE.

CHARLES G. DURFEE, OF ROCHESTER, NEW YORK.

ELECTRIC METER AND SERVICE BOX.

No. 890,851.     Specification of Letters Patent.     Patented June 16, 1908.

Application filed June 3, 1907. Serial No. 377,035.

*To all whom it may concern:*

Be it known that I, CHARLES G. DURFEE, a citizen of the United States, residing at Rochester, in the county of Monroe and State of New York, have invented certain new and useful Improvements in Electric Meter and Service Boxes; and I do declare the following to be a full, clear, and exact description of the invention, such as will enable others skilled in the art to which it appertains to make and use the same.

This invention relates to an electric meter and service box; and has for its object to provide a device of this kind which will be cheap, compact and inaccessible by unauthorized persons.

With this and other objects in view, the invention consists in the improved construction and novel arrangement of parts of such a device as will be hereinafter more fully set forth.

Figure 1:
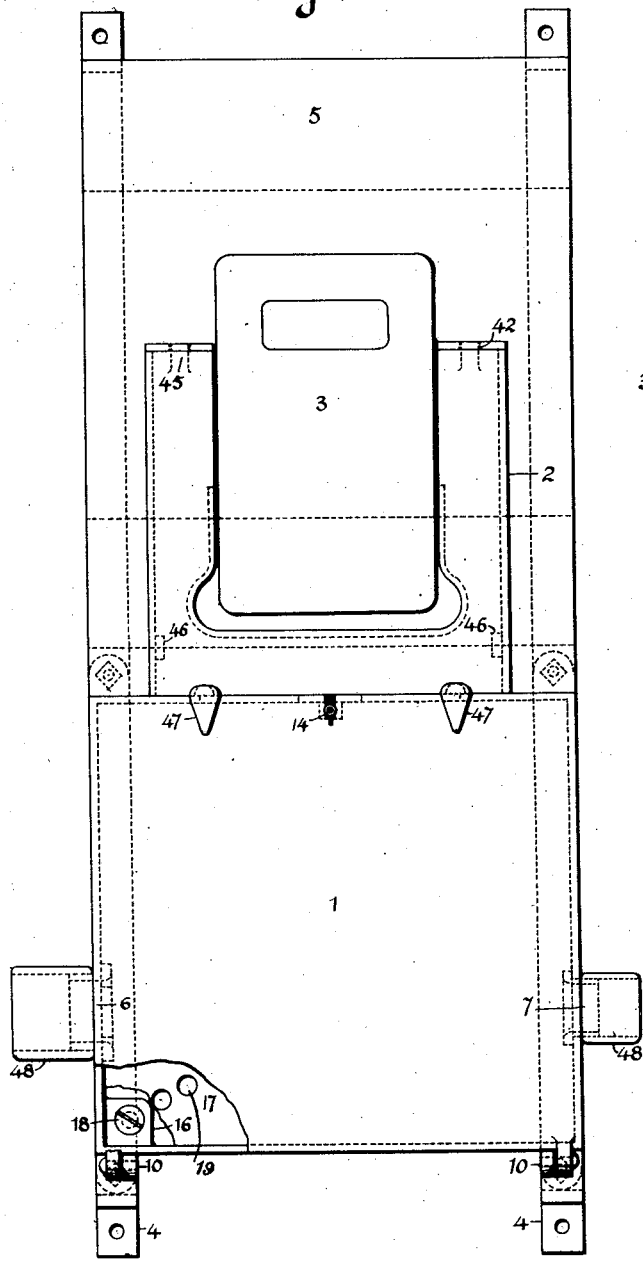
Figure 2:
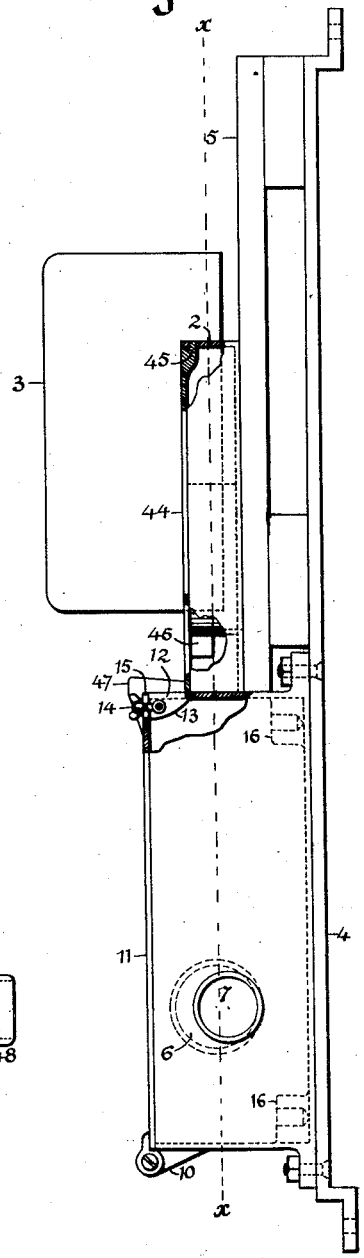
Figure 6:
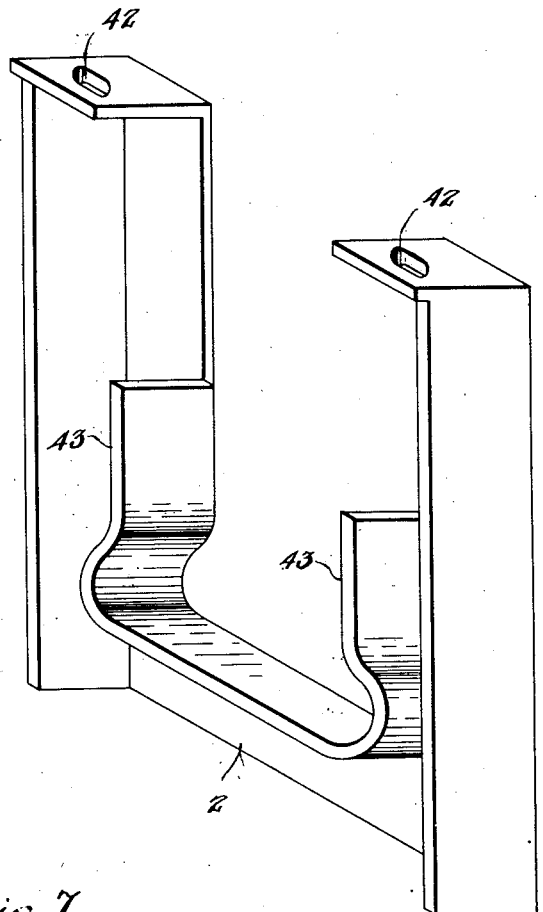
Figure 7:
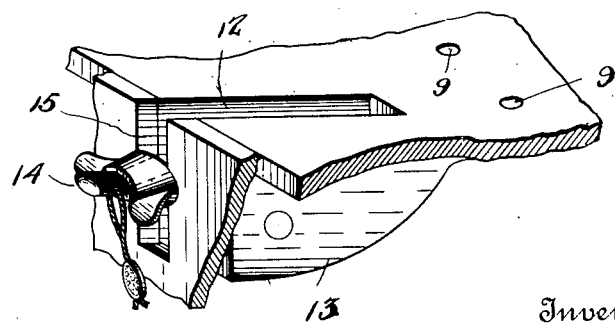

In the accompanying drawings, which illustrate the invention,—Figure 1 is a broken top plan view of one form of the device; Fig. 2 is a broken side elevation of the same; Fig. 3 is an enlarged top plan view of the interior of the service box; Fig. 4 is a side elevation of the same; Fig. 5 is an end elevation of the interior; Fig. 6 is a perspective view of the gutter box; Fig. 7 is a broken perspective view of the lock. Fig. 8 is a transverse vertical section on line $x$—$x$ of Fig. 2 with the meter shown in elevation.

Referring more particularly to the drawings, 1 indicates the service box, 2 the gutter box and 3 a meter. The service box is secured to two brackets 4, which are adapted to be secured in the desired position, and the meter and gutter box are secured to a platform 5, preferably of wood, which is also secured to said brackets. The service box is substantially rectangular and of any desired dimensions and provided upon its opposite sides with inlet and outlet openings 6 and 7, through which the wires 8 are passed from the source of power to the place of application. One of the other walls is provided with openings 9, through which wires are passed to and from the gutter box and the meter. One side wall of the box 1 is provided with lugs 10 to which the cover 11 is pivotally secured in the ordinary manner, and the opposite wall is provided with a notch or recess 12 at the sides of which upon the interior of the box are located two perforated ears 13. A locking bolt 14 is pivotally secured between said ears and is adapted to pass into a notch or recess 15 in the cover for the purpose of locking or sealing the service box against its being opened by unauthorized persons.

Formed upon the bottom of the service box, preferably at the corners, are projections or shoulders 16, upon which a plate 17 of nonconducting material, as of slate, is secured as by means of screws 18. The plate is provided with suitable perforations 19, through which the wires 8 may be passed in leading them from one point of the box to the other to prevent their interfering with the binding and switch mechanism located upon top of the plate.

Adjacent to the inlet openings 6 are two binding posts 20 and 21 to which the service wires 8 are connected. Hinge posts 22 and 23 are connected with the binding posts by means of fuses 24 and a two-knife-bladed switch is pivotally mounted to the posts at one end and adapted to be moved into and out of engagement with yielding contact points 26 at the other end by means of a handle 27, which is connected to the switch blades 25 by the ordinary insulated cross bar 28.

Adjacent to the openings 9 are two double sets 29 and 30 of binding posts, each of which is adapted to be bridged or placed in electrical communication by means of an ordinary plug 31, and one pair of posts of said sets is electrically connected with one of the contact points 26 by means of a bridge piece or connector 32. A connecting wire 33 extends from a binding post 34 connected with the other contact point 26 through one of the perforations 19 underneath the plate 17 to another perforation 19, and is then secured to a binding post 35 of one of the pairs of posts of the double sets of posts, as 29.

A continuation of one of the service wires 8 leads from the binding post 36 of the other pair of the set 29 down through one of the perforations 19 to another perforation 19, and then up through said perforation and out through the outlet opening 7. Two wires 37 and 38 lead from the other pair of binding posts of the set 29 out through one of the openings into the gutter box, thence through the meter box in any ordinary manner, and thence back into the service box through the other opening 9, where their ends are connected with two of the binding posts of the set 30. The other service wire 8 is secured to a binding post 39 connected with one of the pairs 30 and passes down through the perforation 19 and thence up through another perforation 19 and out through the outlet opening 7. Another wire 40 enters the service box through the inlet opening 6, passes down through one of the perforations 19 and divides under the plate 17, one branch of which, 41, passes up through a perforation 19 and thence into the meter. The continuation of the wire 40 passes up through a perforation 19 and out through the outlet 7 to any desired point, as the application of power.

The form of a gutter box that is preferably used and which is shown in the drawings, is recessed upon one side or substantially U-shaped with the end adjacent to the service box open. In the top of each leg of the U there is provided an opening 42 near its upper edge, and the inner portion of the box is provided with a cover support which is preferably in the form of a substantially U-shaped wall 43 which terminates at its ends at a distance from the perforated end walls above referred to. The cover 44 of the gutter box is provided with two projections 45 at one end, which are adapted to enter the openings 42, and with downwardly extending lugs or projections 46, which are adapted to engage with the side walls of the box near the other end and prevent lateral movement of the cover.

Any style of meter may be placed within the space between the legs of the gutter box and secured to the platform 5 and be connected with the wires 37 and 38 in any suitable manner. As the particular form of meter forms no part of this invention, further description of it is unnecessary.

In the form of gutter box shown in the drawings, the rear or free end of the cover 44 abuts against one side of the service box and is held against being removed by means of lugs or hook-like projections 47, which extend from the cover 11 of the service box to the side of the wall of the box provided with the lug or seal 14. The projections 47 are of such a length that when the service box is closed and locked their free ends will engage with the top of the cover 44 and prevent any one from removing the same until after the service box has been opened. By constructing the gutter box in this manner, the inner end is closed when it is placed against the service box and the inner end of the cover and also the inner edges of its sides are firmly supported by the U-shaped wall 43. At the same time, plenty of room is afforded for the passage of the wires 37 and 38 from the openings 9 to the sides of the meter box through the space between the forward ends of the support 43 and the front wall of the sides or legs of the box.

If desired the openings in the walls of the service box may be provided with suitable nipples or bushing 48, which will add to the security and desirability of the device. By constructing a device as above described, all of the wires are concealed, and access to them can be absolutely prevented without destroying the seal, thereby preventing any tampering with the wires or the fuses of the switch by the consumer for any purpose, as stealing electric currents. It permits of cutting out the meter, as by inserting the plugs and thereby allowing the current to go straight through to the consumer through the outlet, whereby the power company can test or change the meter without in any way discommoding the consumer by disconnecting the service wire. Should the company desire at any time to test the consumer's load it can be done by inserting the plugs as heretofore mentioned without disconnecting or interrupting the service in the least.

Having described my invention, I claim:—

1. In a device of the character described, a service box and a gutter box secured adjacent to each other and each provided with a cover, the gutter box being open at one end and substantially U-shaped and having a cover support adjacent to its open end and the walls at the ends of its legs perforated and the ends of the cover therefor provided with lugs for entering said perforations, the other end of said cover being adapted to rest upon said support adjacent to the service box, and the cover of the service box being provided with projections for engaging with the last mentioned end of the gutter box and preventing its removal, and means for locking the cover of the service box.

2. In a gutter box, a substantially U-shaped base having walls upon the outside and the forward end of each leg and a curved wall at the bottom of the inner portion of the U, the walls at the ends of the legs being perforated, and a substantially U-shaped cover, the ends of the legs being provided with projections for engaging with said perforations, and the sides of the legs near the base being provided with lugs for engaging with the outside walls of said legs the portion of the cover between said lugs being adapted to rest upon said curved wall.

In testimony whereof I have hereunto set my hand in presence of two subscribing witnesses.

CHARLES G. DURFEE.

Witnesses:
JAMES COCHRANE,
GEORGE HEARN.